Patented Dec. 15, 1931

1,836,940

UNITED STATES PATENT OFFICE

ROBERT L. SIBLEY, OF NITRO, WEST VIRGINIA, ASSIGNOR TO THE RUBBER SERVICE LABORATORIES COMPANY, OF AKRON, OHIO, A CORPORATION OF OHIO

AGE RESISTING VULCANIZED RUBBER PRODUCT AND PROCESS OF MANUFACTURING SAME

No Drawing.   Application filed October 11, 1930. Serial No. 488,195.

The present invention relates to a process for the manufacture of vulcanized rubber and the products obtained thereby. More particularly, the invention is directed to an improved process of manufacturing vulcanized rubber and the like wherein there is incorporated into a rubber mix of vulcanization characteristics, a compound of the type hereinafter disclosed whereby anti-oxidant or age resisting properties are developed in the vulcanized rubber product. The invention will be understood from the following description and examples wherein a preferred mode of operating the invention is fully set forth and described.

It is well known that rubber deteriorates more or less rapidly when exposed to air, heat and sunlight and that such deterioration is characterized by a loss in the tensile strength, resiliency and other desirable properties of the material. It has now been found according to the present invention that such deterioration can be very greatly lessened if there be incorporated in the rubber mix a compound of the class hereinafter set forth.

The age resisting characteristics of a vulcanized rubber product can be readily ascertained by subjecting samples of the vulcanized product to an accelerated aging test wherein portions of the cured rubber product are subjected in a bomb to the action of oxygen under pressure and maintained for several hours at an elevated temperature. The treated samples are then examined and tested and the results compared with similar results obtained by testing the unaged vulcanized stock. The deterioration in properties suffered as a result of the oxidation treatment is indicative of the result that would normally be expected from that particular stock during several years of natural aging depending on the duration of the test. Such a test is known as the Bierer-Davis aging test.

The new class of anti-oxidant or age resisting materials which have been found upon incorporation into a rubber stock to impart such excellent age resisting qualities to the vulcanized product that portions thereof, when subjected to the artificial aging tests described, undergo only a relatively small loss in tensile strength and other qualities, comprises a reaction product of an aryl amine with a dioxy-diaryl-halogen substituted paraffine.

One method whereby one of the preferred class of anti-oxidants, for example the reaction product of dioxy-dinaphthyl-chlorbutane and ortho-toluidine, may be prepared is as follows:

Dioxy-dinaphthyl-chlorbutane and ortho-toluidine in the ratio of substantially one molecular proportion of the former compound to an excess over substantially four molecular proportions of the latter compound were placed in a suitable container and heated, preferably in the presence of ortho-toluidine hydrochloride, at a temperature of approximately 190 to 205° C. with agitation for substantially three to four hours. After cooling to approximately 30° C., the excess of unreacted ortho-toluidine was removed by making the solution alkaline and distilling, or if convenient or desirable, by washing with a dilute acid, for example hydrochloric acid, and then washing the product with water. It is thought that the reaction representing the preparation of the above compound proceeds as follows:

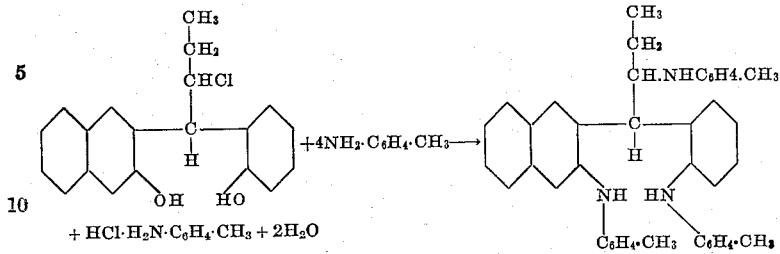

The product prepared as described was compounded in the well known manner in a typical rubber tread stock comprising

```
100    parts of smoked sheet rubber,
 10    parts of zinc oxide,
 40    parts of carbon black,
  2    parts of a blended mineral oil and rosin,
  3.25 parts of sulfur,
  1    part of diphenyl guanidine,
  1    part of the anti-oxidant described.
```

The stock was then vulcanized by heating sheets of the said stock in a press in the well known manner for different periods of time at the temperature given by forty pounds of steam pressure per square inch. Portions of the stock cured as set forth were then artificially aged by heating portions of said stock in an oxygen bomb in the manner described for 39 hours, at a temperature of 70° C. and an oxygen pressure of 300 pounds per square inch. A comparison between the tensile and modulus properties of the aged and unaged vulcanized rubber product is given in the following table:

Table I

| Cure mins. | Hours aged | Modulus of lbs./in.² at 300% | Elasticity in elongations of 500% | Tensile at break in lbs./in.² | Ultimate elongation per cent |
|---|---|---|---|---|---|
| 30 | 0 | 832 | 2170 | 3085 | 640 |
| 30 | 39 | 913 | 2040 | 2295 | 560 |
| 60 | 0 | 1300 | 3095 | 4390 | 660 |
| 60 | 39 | 1305 | 2590 | 2860 | 560 |
| 90 | 0 | 1490 | 3390 | 4435 | 630 |
| 90 | 39 | 1525 | 2783 | 2803 | 520 |

The data set forth in Table I shows that the preferred class of anti-oxidant materials, for example a reaction product of dioxy-dinaphthyl-chlorbutane and ortho-toluidine, possess particularly desirable anti-oxidant properties.

Another example of the preferred class of anti-oxidants was prepared by reacting substantially one molecular proportion of dioxy-dinaphthyl-chlorbutane with an excess over substantially four molecular proportions of aniline, preferably in the presence of aniline hydrochloride, in a manner analogous to that described above. It is thought that the reaction representing the preparation of the compound described proceeds according to the following equation:

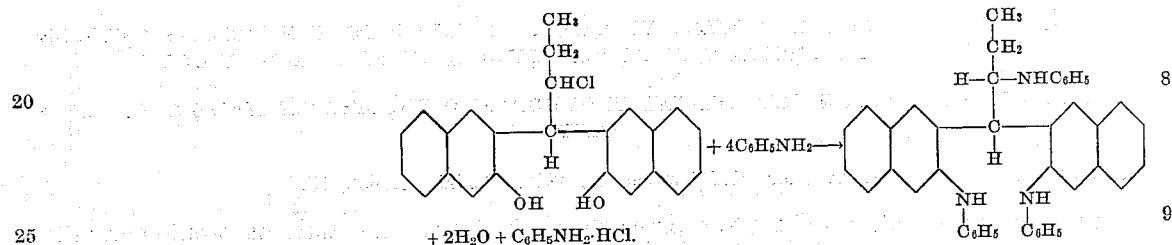

The product thus prepared was incorporated in a rubber mix in the usual manner comprising

```
100    parts of smoked sheet rubber,
 10    parts of zinc oxide,
 40    parts of carbon black,
  2    parts of a blended mineral oil and rosin,
  3.25 parts of sulfur,
  1    part of diphenyl guanidine,
  1    part of the anti-oxidant described.
```

The compounded rubber stock was then cured, as in the previous example, by heating in a press for different periods of time at the temperature exhibited by forty pounds of steam pressure per square inch. The cured rubber product was then aged in the manner set forth for 39 hours at a temperature of 70° C. and under an oxygen pressure of 300 pounds per square inch. The tensile data of the aged and unaged vulcanized rubber product follow in Table II.

Table II

| Cure mins. | Hours aged | Modulus of lbs./in.² at 300% | Elasticity in elongations of 500% | Tensile at break in lbs./in.² | Ultimate elongation per cent |
|---|---|---|---|---|---|
| 30 | 0 | 900 | 2255 | 3315 | 630 |
| 30 | 39 | 621 | 1400 | 1695 | 575 |
| 60 | 0 | 1295 | 3230 | 4320 | 610 |
| 60 | 39 | 1125 | 2210 | 2260 | 510 |
| 90 | 0 | 1725 | 3700 | 4525 | 565 |
| 90 | 39 | 1405 | | 2385 | 470 |

From the data set forth in Table II it is apparent that the reaction product of dioxy-dinaphthyl-chlorbutane and aniline possesses the desirable anti-oxidant properties of the preferred class of compounds.

A further example of the preferred class of anti-oxidants was prepared by reacting substantially one molecular proportion of dioxy-dinaphthyl-chlorbutane with an excess over substantially four molecular proportions of alpha-naphthylamine, preferably in the presence of alpha-naphthylamine hydrochloride, in a manner analogous to that described above. It is thought that the reaction representing the preparation of the compound described proceeds according to the following equation:

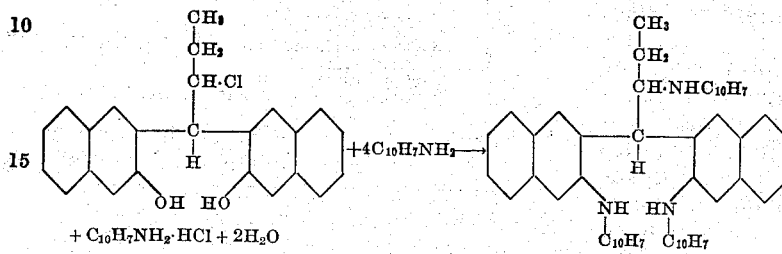

$+ C_{10}H_7NH_2 \cdot HCl + 2H_2O$

The product thus prepared was incorporated in a rubber mix in the usual manner comprising

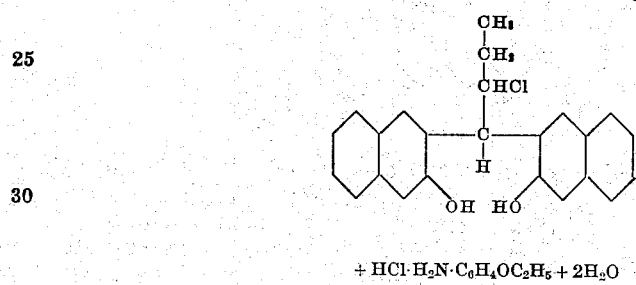

$+ HCl \cdot H_2N \cdot C_6H_4OC_2H_5 + 2H_2O$

```
100    parts of smoked sheet rubber,
 10    parts of zinc oxide,
 40    parts of carbon black,
  2    parts of a blended mineral oil and rosin,
3.25   parts of sulfur,
  1    part of diphenyl guanidine,
  1    part of the anti-oxidant described.
```

The compounded rubber stock was then cured, as in the first mentioned example, by heating in a press for different periods of time at the temperature exhibited by forty pounds of steam pressure per square inch. The cured rubber product was then aged in the manner set forth for 39 hours at a temperature of 70° C. under an oxygen pressure of 300 pounds per square inch. The tensile data of the aged and unaged vulcanized rubber product follows in Table III.

Table III

| Cure mins. | Hours aged | Modulus of lbs./in.² at 300% | Elasticity in elongations of 500% | Tensile at break in lbs./in.² | Ultimate elongation per cent |
|---|---|---|---|---|---|
| 30 | 0  | 859  | 2245 | 3335 | 670 |
| 30 | 39 | 872  | 1915 | 1940 | 520 |
| 60 | 0  | 1260 | 3100 | 4400 | 660 |
| 60 | 39 | 1208 | 2330 | 2400 | 530 |
| 90 | 0  | 1500 | 3460 | 4435 | 625 |
| 90 | 39 | 1413 |      | 2370 | 490 |

From the data set forth in Table III it is apparent that the reaction product of dioxydinaphthyl-chlorbutane and alpha-naphthylamine possesses the desirable anti-oxidant properties of the preferred class of compounds set forth herein.

A further example of the preferred class of anti-oxidants was prepared by reacting substantially one molecular proportion of dioxy-dinaphthyl-chlorbutane with an excess over substantially four molecular proportions of para-phenetidine, preferably in the presence of para-phenetidine hydrochloride, in a manner analogous to that described above. It is thought that the reaction representing the preparation of the compound described proceeds according to the following equation:

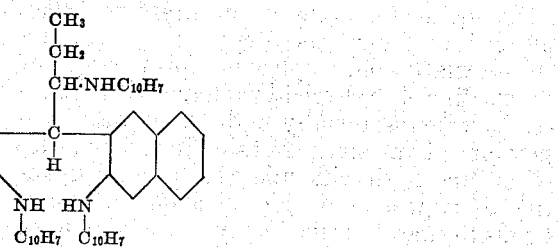

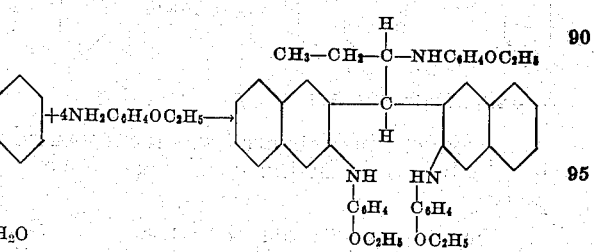

The product thus prepared was incorporated in a rubber mix in the usual manner comprising

```
100    parts of smoked sheet rubber,
 10    parts of zinc oxide,
 40    parts of carbon black,
  2    parts of a blended mineral oil and rosin,
3.25   parts of sulfur,
  1    part of diphenyl guanidine,
  1    part of the anti-oxidant described.
```

The compounded rubber stock was then cured, as in the first mentioned example, by heating in a press for different periods of time at the temperature exhibited by forty pounds of steam pressure per square inch. The cured rubber product was then aged in the manner set forth for 39 hours at a temperature of 70° C. under an oxygen pressure of 300 pounds per square inch. The tensile data of the aged and unaged vulcanized rubber product follow in Table IV.

Table IV

| Cure mins. | Hours aged | Modulus of lbs./in.² at 300% | Elasticity in elongations of 500% | Tensile at break in lbs./in.² | Ultimate elongation per cent |
|---|---|---|---|---|---|
| 30 | 0  | 856  | 2110 | 3530 | 685 |
| 30 | 39 | 968  | 2140 | 2500 | 565 |
| 60 | 0  | 1293 | 3140 | 4485 | 665 |
| 60 | 39 | 1420 | 2785 | 2890 | 550 |
| 90 | 0  | 1513 | 3450 | 4305 | 610 |
| 90 | 39 | 1575 | 2920 | 2945 | 520 |

The data set forth in Table IV shows that the preferred class of materials, and specifically a reaction product of dioxy dinaphthylchlorbutane and para phenetidine comprises an important group of anti-oxidants. The vulcanized rubber stock wherein the preferred class of materials was incorporated prior to the vulcanization thereof showed remarkably little depreciation in tensile properties when aged in the manner described.

A further example of the preferred class of anti-oxidants was prepared by reacting substantially one molecular proportion of dioxy-dinaphthyl-trichlorethane with an excess over substantially eight molecular proportions of aniline, preferably in the presence of aniline hydrochloride and a small quantity of cuprous chloride, in a manner analogous to that described above. It is thought that the reaction representing the preparation of the compound described proceeds according to the following equation:

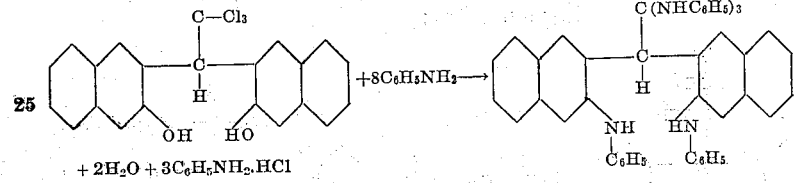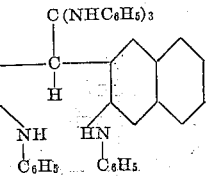

The product thus prepared was incorporated in a rubber mix in the usual manner comprising

```
100   parts of smoked sheet rubber,
 10   parts of zinc oxide,
 40   parts of carbon black,
  2   parts of a blended mineral oil and rosin,
3.25  parts of sulfur,
  1   part of diphenyl guanidine,
  1   part of the anti-oxidant described.
```

The compounded rubber stock was then cured, as in the first mentioned example, by heating in a press for different periods of time at the temperature exhibited by forty pounds of steam pressure per square inch. The cured rubber product was then aged in the manner set forth for 39 hours at a temperature of 70° C. under an oxygen pressure of 300 pounds per square inch. The tensile data of the aged and unaged vulcanized rubber product follows in Table V.

*Table V*

| Cure mins. | Hours aged | Modulus of lbs./in.² at 300% | Elasticity in elongations of 500% | Tensile at break in lbs./in.² | Ultimate elongation per cent |
|---|---|---|---|---|---|
| 30 | 0  | 897  | 2210 | 3210 | 640 |
| 30 | 39 | 706  | 1340 | 1730 | 515 |
| 60 | 0  | 1445 | 3300 | 3950 | 520 |
| 60 | 39 | 1245 | 2340 | 2565 | 530 |
| 90 | 0  | 1640 | 3670 | 3915 | 535 |
| 90 | 39 | 1553 |      | 2615 | 490 |

The data set forth in Table V shows further that the preferred class of compounds, that is a reaction product of an aryl amine and a dioxy-diaryl-halogen substituted paraffine, comprises a group of valuable rubber anti-oxidants.

As a further example of operating the present invention, a product was prepared by reacting substantially one molecular proportion of dioxy-diphenyl-chlorbutane with substantially three molecular proportions of aniline, and this product was compounded in a rubber mix comprising

```
100   parts of smoked sheet rubber,
 40   parts of carbon black,
 10   parts of zinc oxide,
  2   parts of a blended mineral oil and rosin,
3.25  parts of sulfur,
  1   part of diphenyl guanidine,
  1   part of the anti-oxidant described above.
```

The compounded rubber stock thus formed was cured in the usual manner and portions of the cured rubber product were artificially aged in the manner previously described. It was found that the cured rubber product, wherein the anti-oxidant described above was employed, showed increased age resisting properties over a similar stock wherein an accelerator, for example, diphenyl guanidine was employed without an anti-oxidant.

In a manner analogous to that hereinbefore set forth dioxy-diphenyl chlorbutane, dioxy-dinaphythyl trichlorethane, dioxy dinaphthyl chlorbutane and the like may be reacted with benzidine, tolidine, beta naphthyl amine, xylidene, amino diphenyl and analogous aromatic amines and the product thus obtained employed as an anti-oxidant in a rubber stock of vulcanization characteristics.

In the examples hereinbefore set forth, diphenyl guanidine was employed as the accelerator, because it is known that a stock wherein it is employed possesses poor aging qualities which does not mask the effect of the anti-oxidant employed. In fact, a tread stock of the composition employed in the examples cured in the presence and under the influence of diphenyl guanidine as an accelerator, but containing no anti-oxidant, melts down to a shapeless mass incapable of test when subjected to the aging test described. Other accelerators could, of course, have been employed and different modulus and tensile figures obtained from those hereinbefore set forth, but still exhibiting the desirable age resisting properties of the preferred class of compounds.

From the data hereinbefore set forth it is apparent that the preferred class of compounds comprises an important class of anti-oxidants which have been employed successfully and advantageously in a rubber stock.

The present invention is limited solely by the claims attached hereto as a part of the present specification wherein it is intended to claim the invention as broadly as possible in view of the prior art.

What is claimed is:

1. The process of vulcanizing rubber which comprises heating a mixture of rubber and sulfur in the presence of an anti-oxidant comprising a reaction product of an aryl amine with a dioxy-diaryl halogen substituted paraffine.

2. The process of vulcanizing rubber which comprises heating a mixture of rubber and sulfur in the presence of an anti-oxidant comprising a reaction product of an aryl amine with a dioxy-diaryl chlorine substituted paraffine.

3. The process of vulcanizing rubber which comprises heating a mixture of rubber and sulfur in the presence of an anti-oxidant comprising a reaction product of an aryl amine with a dioxy-diaryl chlorbutane.

4. The process of vulcanizing rubber which comprises heating a mixture of rubber and sulfur in the presence of an anti-oxidant comprising a reaction product of an aryl amine with dioxy-dinaphthyl chlorbutane.

5. The process of vulcanizing rubber which comprises heating a mixture of rubber and sulfur in the presence of an anti-oxidant comprising the reaction product of ortho-toluidine with dioxy-dinaphthyl chlorbutane.

6. The vulcanized rubber product produced by heating a mixture of rubber and sulfur in the presence of an anti-oxidant comprising a reaction product of an aryl amine with a dioxy-diaryl halogen substituted paraffine.

7. The vulcanized rubber product produced by heating a mixture of rubber and sulfur in the presence of an anti-oxidant comprising a reaction product of an aryl amine with a dioxy-diaryl chlorine substituted paraffine.

8. The vulcanized rubber product produced by heating a mixture of rubber and sulfur in the presence of an anti-oxidant comprising a reaction product of an aryl amine with a dioxy-diaryl-chlorbutane.

9. The vulcanized rubber product produced by heating a mixture of rubber and sulfur in the presence of an anti-oxidant comprising a reaction product of an aryl amine with dioxy-dinaphthyl-chlorbutane.

10. The vulcanized rubber product produced by heating a mixture of rubber and sulfur in the presence of an anti-oxidant comprising a reaction product of ortho-toluidine with dioxy-dinaphthyl-chlorbutane.

11. The process of vulcanizing rubber which comprises heating a mixture of rubber and sulfur in the presence of an anti-oxidant comprising a reaction product of an aryl amine with a dioxy-diaryl substituted alkylidene halide.

12. The process of vulcanizing rubber which comprises heating a mixture of rubber and sulfur in the presence of an anti-oxidant comprising a reaction product of an aryl amine with a dioxy-diaryl substituted alkylidene chloride.

13. The process of vulcanizing rubber which comprises heating a mixture of rubber and sulfur in the presence of an anti-oxidant comprising a reaction product of an aryl amine with a dioxy-dinaphthyl substituted alkylidene chloride.

14. The process of vulcanizing rubber which comprises heating a mixture of rubber and sulfur in the presence of an anti-oxidant comprising a reaction product of an aryl amine with a dioxy-dinaphthyl substituted alkylidene chloride, said alkylidene group containing less than five carbon atoms.

15. The process of vulcanizing rubber which comprises heating a mixture of rubber and sulfur in the presence of an anti-oxidant comprising the reaction product of substantially three mols of ortho-toluidine and substantially one mol of dioxy-dinaphthyl-chlorbutane.

16. The vulcanized rubber product produced by heating a mixture of rubber and sulfur in the presence of an anti-oxidant comprising a reaction product of an aryl amine with a dioxy-diaryl substituted alkylidene halide.

17. The vulcanized rubber product produced by heating a mixture of rubber and sulfur in the presence of an anti-oxidant comprising a reaction product of an aryl amine with a dioxy-diaryl substituted alkylidene chloride.

18. The vulcanized rubber product produced by heating a mixture of rubber and sulfur in the presence of an anti-oxidant comprising a reaction product of an aryl amine with a dioxy-dinaphthyl substituted alkylidene chloride.

19. The vulcanized rubber product produced by heating a mixture of rubber and sulfur in the presence of an anti-oxidant comprising a reaction product of an aryl amine with a dioxy-dinaphthyl substituted alkylidene chloride, said alkylidene group containing less than five carbon atoms.

20. The vulcanized rubber product produced by heating a mixture of rubber and sulfur in the presence of an anti-oxidant comprising the reaction product of substantially three mols of ortho-toluidine and substantially one mol of dioxy-dinaphthyl-chlorbutane.

In testimony whereof I hereunto affix my signature.

ROBERT L. SIBLEY.